United States Patent
Tang et al.

(10) Patent No.: US 11,519,626 B2
(45) Date of Patent: Dec. 6, 2022

(54) SIGNAL TRANSMISSION METHOD, SYSTEM, DEVICE, STORAGE MEDIUM AND ELECTRONIC DEVICE

(71) Applicant: Gree Electric Appliances, Inc. of Zhuhai, Guangdong (CN)

(72) Inventors: Jie Tang, Guangdong (CN); Weiyou Yu, Guangdong (CN); Tieying Ye, Guangdong (CN); Chengkang Qu, Guangdong (CN); Wencan Wang, Guangdong (CN); Zhongwen Deng, Guangdong (CN); Quanzhou Liu, Guangdong (CN); Dongfeng Lai, Guangdong (CN)

(73) Assignee: Gree Electric Appliances, Inc. of Zhuhai, Guangdong (CN)

( * ) Notice: Subject to any disclaimer, the term of this patent is extended or adjusted under 35 U.S.C. 154(b) by 179 days.

(21) Appl. No.: 17/047,040

(22) PCT Filed: Dec. 6, 2018

(86) PCT No.: PCT/CN2018/119538
§ 371 (c)(1),
(2) Date: Oct. 12, 2020

(87) PCT Pub. No.: WO2019/196441
PCT Pub. Date: Oct. 17, 2019

(65) Prior Publication Data
US 2021/0148594 A1    May 20, 2021

(30) Foreign Application Priority Data

Apr. 13, 2018  (CN) .......................... 201810333819.8

(51) Int. Cl.
*F24F 11/56* (2018.01)
*F24F 11/88* (2018.01)
(Continued)

(52) U.S. Cl.
CPC .............. *F24F 11/56* (2018.01); *F24F 11/64* (2018.01); *F24F 11/65* (2018.01); *F24F 11/88* (2018.01);
(Continued)

(58) Field of Classification Search
CPC ... H04B 2203/5466; H04B 3/54; H04B 3/542
See application file for complete search history.

(56) References Cited

U.S. PATENT DOCUMENTS 4,642,607 A    2/1987  Strom et al.
2013/0170077 A1  7/2013 Dillig et al.
(Continued)

FOREIGN PATENT DOCUMENTS

CN    1871786 A    11/2006
CN    204665579 U    9/2015
(Continued)

*Primary Examiner* — David S Huang
(74) *Attorney, Agent, or Firm* — The Webb Law Firm

(57) ABSTRACT

The present disclosure relates to a signal transmission method, system, device, a storage medium and an electronic device. The method includes: determining data to be transmitted by a unit in air conditioning units; and transmitting, by the unit, the data to be transmitted to other units through a designated power line in multiphase power lines, wherein the designated power line is any power line in the multiphase power lines, and the designated power line is a power line shared by all units in the air conditioning units.

17 Claims, 5 Drawing Sheets

(51) Int. Cl.
*F24F 11/64* (2018.01)
*F24F 11/65* (2018.01)
*G05B 15/02* (2006.01)
*H04B 3/54* (2006.01)

(52) U.S. Cl.
CPC .............. *G05B 15/02* (2013.01); *H04B 3/54* (2013.01); *H04B 2203/5466* (2013.01)

(56) References Cited

U.S. PATENT DOCUMENTS

2015/0323582 A1* 11/2015 Pigeon .................. G01R 31/40
324/86
2020/0400331 A1* 12/2020 Hanai ................ H04L 61/5038

FOREIGN PATENT DOCUMENTS

| CN | 106052007 A | 10/2016 |
| CN | 106052045 A | 10/2016 |
| CN | 106067837 A | 11/2016 |
| CN | 106225181 A | 12/2016 |
| CN | 106330734 A | 1/2017 |
| CN | 108662722 A | 10/2018 |
| JP | H05175972 A | 7/1993 |
| WO | 2004114543 A1 | 12/2004 |

* cited by examiner

SIGNAL TRANSMISSION METHOD, SYSTEM, DEVICE, STORAGE MEDIUM AND ELECTRONIC DEVICE

CROSS-REFERENCE TO RELATED APPLICATIONS

This application is the United States national phase of International Application No. PCT/CN2018/119538 filed Dec. 6, 2018, and claims priority to Chinese patent application no. 201810333819.8 filed Apr. 13, 2018, the disclosures of which are hereby incorporated by reference in their entirety.

BACKGROUND OF THE INVENTION

Field of the Invention

The present disclosure relates to the field of communication, and in particular, to a signal transmission method, a signal transmission system, a signal transmission device, a storage medium, and an electronic device.

Description of Related Art

A communication network used by air conditioning units in the related art is formed by connecting an indoor unit and an outdoor unit through communication lines. Air conditioners are everywhere, and the use of a large number of air conditioners is accompanied by the use of a large number of communication lines. Especially multi-connected air conditioning unit system has characteristics of large number of air conditioners, scattered or concealed installation positions, etc. Since a power line network used for power supply has been ubiquitous. Therefore, the air conditioning units is connected to the power line network through the power line used for power supply, the communication lines and its engineering installation are saved, and the phenomenon of poor communication lines is eliminated.

SUMMARY OF THE INVENTION

The disclosure provides a signal transmission method, system, device, a storage medium and an electronic device.

According to some embodiments of the present disclosure, there is provided a signal transmission method, comprising: determining data to be transmitted by a unit in air conditioning units; and transmitting, by the unit, the data to be transmitted to other units through a designated power line in multiphase power lines, wherein the designated power line is any power line in the multiphase power lines, and the designated power line is a power line shared by all units in the air conditioning units.

According to some embodiments of the present disclosure, there is provided a signal transmission system, comprising: air conditioning units and multiphase power lines, wherein the air conditioning units comprises at least two units, each of the at least two units is connected with at least two power lines in the multiphase power lines, and the at least two units share one power line as a shared power line in the multiphase power lines, and the at least two units transmit signal to each other through the shared power line.

According to further embodiments of the present disclosure, there is provided signal transmission device, comprising: a first determination module configured to determine data to be transmitted; and a transmission module configured to transmit the data to be transmitted to other units through a designated power line in multiphase power lines, wherein the designated power line is any power line in the multiphase power lines, and the designated power line is a power line shared by all units in the air conditioning units.

According to still further embodiments of the present disclosure, there is provided a non-transitory computer-readable storage medium storing computer programs, wherein when the computer programs are executed by a processor, cause the processor to perform the method as described in any of the above embodiments.

According to still further embodiments of the present disclosure, there is provided an electronic device comprising a memory and a processor coupled to the memory, wherein the memory stores computer programs and the processor is configured to execute the computer programs to perform the method as described in any of the above embodiments.

BRIEF DESCRIPTION OF THE DRAWINGS

The drawings described here are used to provide a further understanding of the present disclosure and constitute a part of this disclosure. The exemplary embodiments of the present disclosure and their descriptions are used to explain the present disclosure, and do not constitute an improper limitation of the present disclosure. In the drawings.

DESCRIPTION OF THE INVENTION

Figure 1:
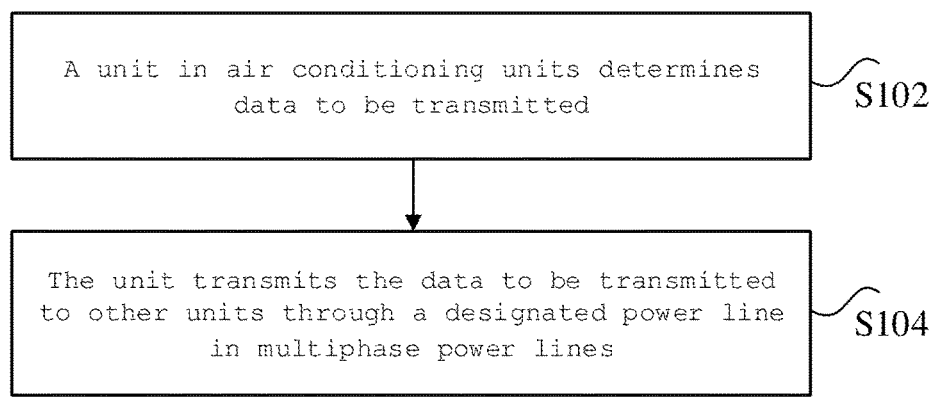
FIG. 1 illustrates a flow diagram of a signal transmission method of some embodiments of the present disclosure.

In order to make the technical solutions of the present disclosure better understood by those skilled in the art, the technical solutions in the embodiments of the present disclosure will be clearly and completely described below with reference to the drawings in the embodiments of the present disclosure, and it is obvious that the described embodiments are only some, instead of all, of the embodiments of the present disclosure. All other embodiments obtained by a person of ordinary skill in the art based on the embodiments in the present disclosure without making creative efforts shall fall within the protection scope of the present disclosure.

It should be noted that the terms "first," "second," and the like in the description and claims of the present disclosure and in the foregoing drawings are used for distinguishing similar elements and not necessarily for describing a particular sequential or precedence order. It should be understood that the data used in this way is able to be interchanged under appropriate circumstances so that the embodiments of the present disclosure described herein is able to be implemented in an order other than those illustrated or described herein. Moreover, the terms "comprise," and "have" and any variations thereof, are intended to cover a non-exclusive inclusion, for example, a process, method, system, article, or apparatus that comprises a list of steps or elements is not necessarily limited to those steps or elements expressly listed, but comprises other steps or elements not expressly listed or inherent to such process, method, article, or apparatus.

The inventors find that the existing power line carrier communication technology adopts two-wire differential transmission, and if units in the air conditioning units which are communicating to each other are connected with wires of different phase sequences (for example, the inner unit is connected to wires L1 and N, whereas the outer unit is connected to wires L2 and N), communication failure will be caused.

In accordance with some embodiments of the present disclosure, there is provided a signal transmission method. It should be noted that the steps illustrated in the flow diagram of the drawing are performed, for example, in a computer system of a set of computer executable instructions, and that while a logical order is illustrated in the flow diagram, in some cases, the steps illustrated or described are performed in an order different than here.

FIG. 1 is a schematic flow diagram of a signal transmission method according to some embodiments of the present disclosure. As shown in FIG. 1, the method comprises the following steps: S102-S104.

In step S102, a unit in air conditioning units determines data to be transmitted.

In step S104, the unit transmits the data to be transmitted to other units through a designated power line in multiphase power lines, wherein the designated power line is any power line in the multiphase power lines, and the designated power line is a power line shared by all units in the air conditioning units.

In the above steps, a mode that all units in the air conditioning units share one power line in the multi-phase power lines and the shared power line is used for signal transmission is adopted, that is, communication in the air conditioning units is established through a single power line, so that all units realize normal communication without being connected to identical phase lines, thereby reducing the requirement on the topological structure of the power lines, and further solving the technical problem of communication failure caused by an application of different phase lines among the units of an air conditioner in power line carrier communication in the related art.

It should be noted that, in some embodiments, the designated power line is a live wire, a naught wire, or a ground wire, but is not limited thereto. To achieve the purpose of simplifying installation, in some embodiments of the present disclosure, the designated power line is a naught wire.

Figure 5:
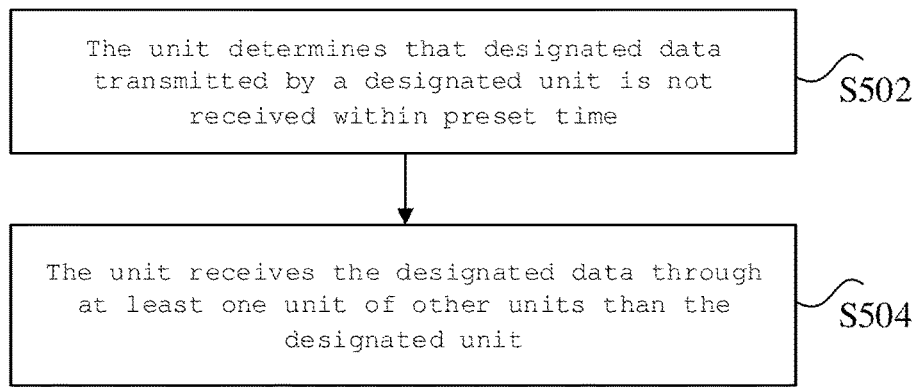
FIG. 5 illustrates a flow diagram of a signal transmission method of further embodiments of the present disclosure.

It should be noted that, the signal attenuation is larger during single-line transmission, and a unit will not receive data sent by other units that are far away from the unit possibly. Therefore, in some embodiments of the present disclosure, as shown in FIG. 5, the method further comprises: in step S502, the unit determines that designated data transmitted by a designated unit is not received within preset time; and in step S504, the unit receives the designated data through at least one unit of other units than the designated unit. That is, the at least one unit of the other units is used as a relay, and the designated data is acquired from the relay.

Figure 6:
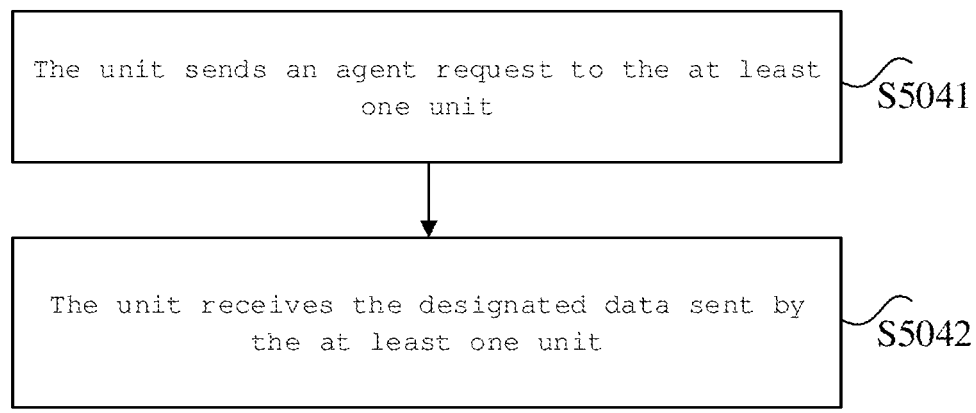
FIG. 6 illustrates a flow diagram of a signal transmission method of still further embodiments of the present disclosure.

It should be noted that, in some embodiments, as shown in FIG. 6, the step S504 in which the unit receives the designated data through at least one unit of other units than the designated unit comprises: in step S5041, the unit sends an agent request to the at least one unit; and in step S5042, the unit receives the designated data sent by the at least one unit, wherein the designated data sent by the at least one unit is the designated data received by the at least one unit from the designated unit through the designated power line.

It should be noted that, in some embodiments, the designated unit comprises an outdoor unit in the air conditioning units.

It should be noted that, in some embodiments, the unit in the air conditioning units comprises: a motherboard controller, wherein the motherboard controller comprises an air conditioner control unit and a power line carrier communication module which are communicated through a serial port. Thus, the above step S104 comprises: the air conditioner control unit in the unit sends data to be sent (the data to be transmitted) to the power line carrier communication module in the unit through the serial port, and the power line carrier communication module in the unit processes (such as processes optimized coding and modulation) data received from the air conditioner control unit to create processed data, so that the processed data is more suitable for single-line transmission, the power line carrier communication module in the unit couples the processed data to a designated power line (communication line), and power line carrier communication modules in other units receive the processed data through the designated power line, and perform corresponding processing (such as demodulation and decoding) to create decoded data, and transmit the decoded data to the air conditioner control units in the other units through the serial port.

It should be noted that, in order to ensure the reliability of communication, firstly, an error-correctable encoding should be used and a modulation method suitable for the channel (communication line) is adopted, and secondly, a corresponding verification measure should also be adopted at an application layer. In a case that an environmental noise is large, the signal-to-noise ratio is increased by increasing the transmitting power; or under the condition of ensuring the requirement of the lowest communication speed, the communication speed is reduced to improve the signal-to-noise ratio. In some embodiments, the above methods are used together to increase the reliability of communication.

Figure 7:
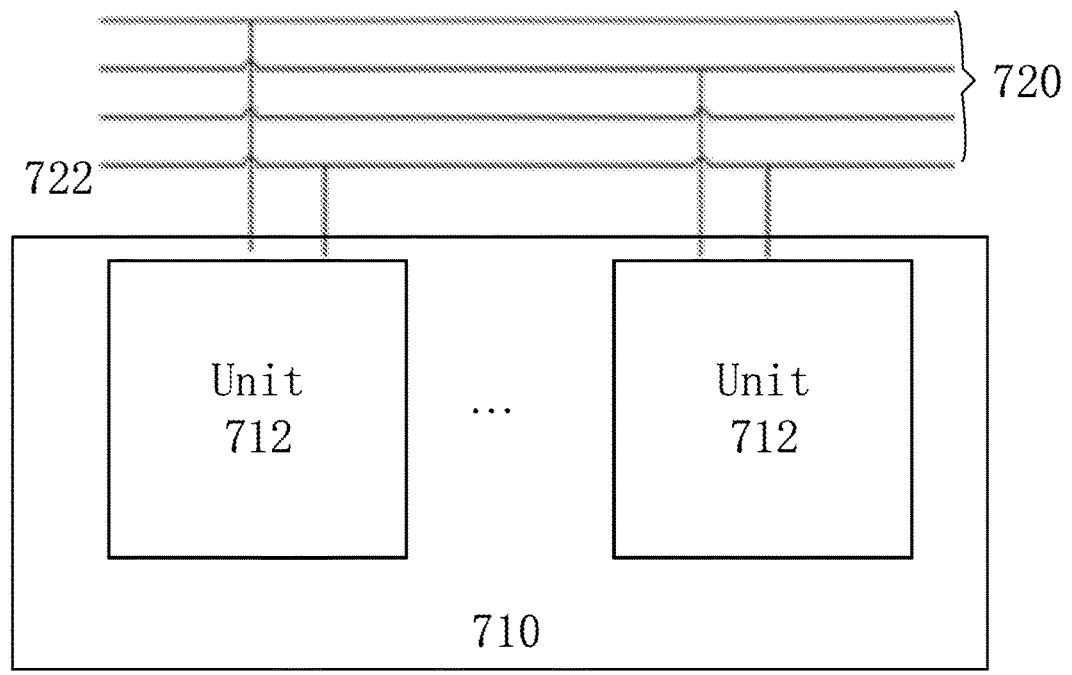
FIG. 7 illustrates a block diagram of a structure of a signal transmission system of some embodiments of the present disclosure.

In some embodiments, as shown in FIG. 7, the present disclosure further provides a signal transmission system, comprising: air conditioning units 710 and multiphase power lines 720, wherein the air conditioning units comprises at least two units 712, each of the at least two units is connected with at least two power lines 722 in the multiphase power lines 720, and the at least two units 712 share one power line 722 as a shared power line in the multiphase power lines 720, and the at least two units 712 transmit signal to each other through the shared power line.

In the above embodiments of signal transmission system, a mode that all units in the air conditioning units share one power line in the multi-phase power lines and the shared power line is used for signal transmission is adopted, that is, communication in the air conditioning units is established through a single power line, so that all units realize normal communication without being connected to identical phase lines, thereby reducing the requirement on the topological structure of the power lines, and further solving the technical problem of communication failure caused by an application of different phase lines among the units of an air conditioner in power line carrier communication in the related art.

It should be noted that, in some embodiments, the shared power line is a live wire, a naught wire, or a ground wire, but is not limited thereto. To achieve the purpose of simplifying installation, in some embodiments of the present disclosure, the shared power line is a naught wire.

Figure 8:
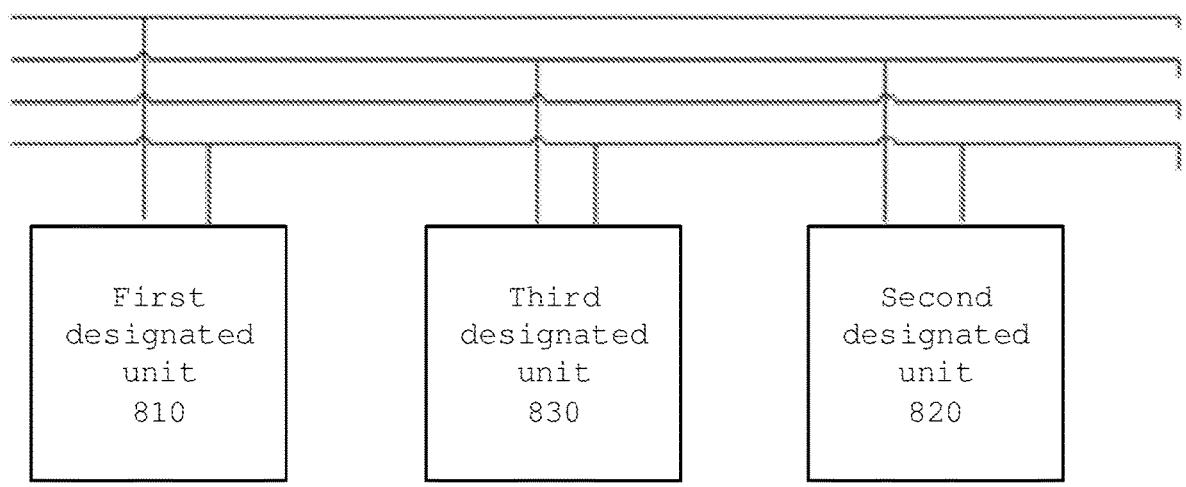
FIG. 8 illustrates a wiring schematic diagram of air conditioning units based on a single-line transmission of power line carrier communication according to further embodiments of the present disclosure.

It should be noted that, the signal attenuation is larger during single-line transmission, and a unit will not receive data sent by other units that are far away from the unit possibly. Therefore, as shown in FIG. 8, in some embodiments of the present disclosure, in a case that the air conditioning units comprises at least three units, a first designated unit 810 of the at least three units receives a signal sent by a second designated unit 820 of the at least three units through the shared power line or acquires a signal sent by the second designated unit 820 through a third designated unit 830 of the at least three units; or the first designated unit 810 receives a signal sent by the second designated unit 820 through the shared power line and acquires a signal sent by the second designated unit 820 through the third designated unit 830.

It should be noted that, in some embodiments, the second designated unit is an outdoor unit in air conditioning units, and the first designated unit and the third designated unit are indoor units in the air conditioning units, but are not limited thereto.

The following describes the structure of the system, taking as examples that some units in the air conditioning units are outdoor units and some units are indoor units.

Figure 2:
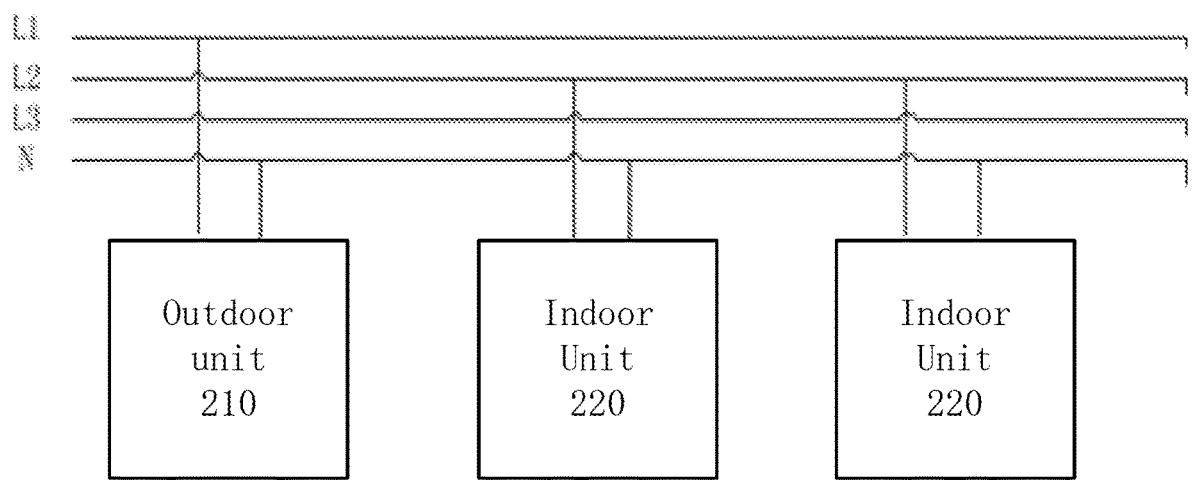
FIG. 2 illustrates a wiring schematic diagram of air conditioning units based on a single-line transmission of power line carrier communication according to some embodiments of the present disclosure.

FIG. 2 a wiring schematic diagram of air conditioning units based on a single-line transmission of power line carrier communication according to some embodiments of the present disclosure. As shown in FIG. 2, the air conditioning units comprises an outdoor unit 210 and two indoor units 220, wherein the outdoor unit 210 is connected to power lines L1 and N (naught wire), the two indoor units 220 are connected to power lines L2 and N, and thus the outdoor unit 210 and the two indoor units 220 are all connected to N, and N is used as a communication line for communication between the outdoor unit 210 and the two indoor units 220. Nin the embodiments corresponds to the shared power line in the above embodiments.

Figure 3:
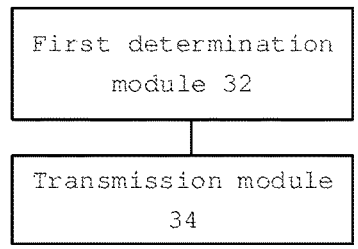
FIG. 3 illustrates a block diagram of a structure of a signal transmission device of some embodiments of the present disclosure.

The embodiments of the present disclosure also provide a signal transmission device. FIG. 3 is a block diagram of a structure of a signal transmission device according to some embodiments of the present disclosure, and as shown in FIG. 3, the device comprises: a first determination module 32 and a transmission module 34.

The first determination module 32 is configured to determine data to be transmitted;

The transmission module 34 is connected to the first determination module 32, and configured to transmit the data to be transmitted to other units through a designated power line in multiphase power lines, wherein the designated power line is any power line in the multiphase power lines, and the designated power line is a power line shared by all units in the air conditioning units.

In the above device, a mode that all units in the air conditioning units share one power line in the multi-phase power lines and the shared power line is used for signal transmission is adopted, that is, communication in the air conditioning units is established through a single power line, so that all units realize normal communication without being connected to identical phase lines, thereby reducing the requirement on the topological structure of the power lines, and further solving the technical problem of communication failure caused by an application of different phase lines among the units of an air conditioner in power line carrier communication in the related art.

It should be noted that, in some embodiments, designated power line is a live wire, a naught wire, or a ground wire, but is not limited thereto. To achieve the purpose of simplifying installation, in some embodiments of the present disclosure, the designated power line is a naught wire.

Figure 9:
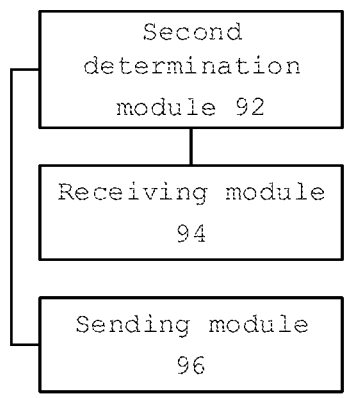
FIG. 9 illustrates a block diagram of a structure of a signal transmission device of some embodiments of the present disclosure.

In some embodiments, as shown in FIG. 9, the device further comprises: a second determination module 92 configured to determine that the designated data transmitted by the designated unit is not received within preset time; and a receiving module 94 configured to receive the designated data through at least one unit of other units than the designated unit.

It should be noted that, in some embodiments, as shown in FIG. 9, the device further comprises: a sending module 96 configured to transmit an agent request to the at least one unit. The receiving module 94 is configured to receive the designated data sent by the at least one unit, wherein the designated data sent by the at least one unit is the designated data received by the at least one unit from the designated unit through the designated power line.

It should be noted that, in some embodiments, the designated unit comprises an outdoor unit in the air conditioning units.

For a better understanding of the present disclosure, the present disclosure is further explained below in conjunction with some embodiments.

Some embodiments of the present disclosure provides a method for establishing communication between air conditioning units through a single power line carrier. In some embodiments, any of a Live wire, a naught wire and a ground wire is used as a communication line.

As shown in FIG. 2, the air conditioning units adopts single-line PLC communication, and the indoor unit and the outdoor unit normally communicate without being connected to identical phase lines (L1, L2, L3) in a case the indoor unit and the outdoor unit are connected to a power supply network. In FIG. 2, a neutral wire is taken as a communication line, and practical applications comprise, but are not limited to, a neutral wire is used for communication.

Figure 4:
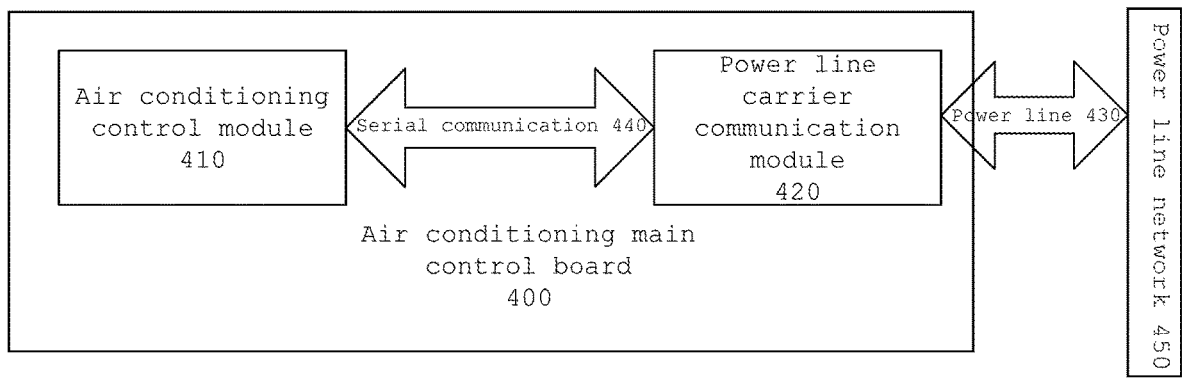
FIG. 4 illustrates a structural diagram of communication control of air conditioning units based on a single-line transmission of power line communication according to some embodiments of the present disclosure.

FIG. 4 is a structural diagram of communication control of air conditioning units based on a single-line transmission of power line communication according to some embodiments of the present disclosure. As shown in FIG. 4, an implementation of an air conditioning main control board 400 in the air conditioning units coupling data to be transmitted to a power supply power line network 450 and parsing communication data from the power supply power line network 450 through a power line 430 is completed by an air conditioning control module 410 in cooperation with a power line carrier communication module 420 in the air conditioning units, wherein the air conditioning control module 410 and the power line carrier communication module 420 perform data interaction with each other through serial communication 440.

The disclosure provides some embodiments of an application of the power line carrier communication (PLC) technology based on single-line transmission in a communication network of air conditioning units. The mechanism involved is as follows.

1) Connection Mode of Communication Lines of Air Conditioning Units

The communication lines of the air conditioning units are power lines. At least one line of the power lines shared by all units is ensured. As all the units need to be connected to the naught wire, it is recommended to perform signal transmission through the naught wire to achieve the purpose of simple and convenient installation.

2) Communication Mode of the Air Conditioning Units

An air conditioning control module of the air conditioning units sends data to be transmitted to the power line carrier communication module through the serial port, and the power line carrier communication module conducts optimized coding and modulation on the data to enable the data to be more suitable for a single-line transmission channel and then couples the data to a communication line. The power line carrier communication modules of other devices conduct demodulation and decoding after receiving the data through the communication line to create decoded data, and then send the decoded data to the air conditioning control modules of the air conditioning units through the serial port to be processed.

3) Processing Method in Long-Distance Transmission

During transmission, an signal attenuation of the single-line transmission is large, and an indoor unit which is far away will not receive data of an outdoor unit, and the indoor unit which can't receive the data of the outdoor unit sends an agent request to surrounding indoor units. After receiving the agent request, an surrounding inner unit which is able to receive the data of the outer unit confirms and serves as a relay of the inner unit which is far away in the subsequent transmission.

4) Guarantee of Communication Reliability

Firstly, an error-correctable encoding should be used and a modulation method suitable for the channel (communication line) is adopted, and secondly, a corresponding verification measure should also be adopted at an application layer. In a case that an environmental noise is large, the signal-to-noise ratio is increased by increasing the transmitting power; or under the condition of ensuring the requirement of the lowest communication speed, the communication speed is reduced to improve the signal-to-noise ratio. In some embodiments, the above methods are used together to increase the reliability of communication.

The above embodiments solve the problem of communication failure caused by the application of different phase lines among the units, in a case of an application of power line carrier communication (PLC) on the air conditioning units network, which reduces the requirements on the topological structure of the power line, and simplifies the installation.

The above embodiment of the present disclosure also achieves the following technical effects: communication lines are saved; during installation, the phase of a power line does not need to be concerned; a new solution is provided for the Power Line Communication (PLC) technology in the communication of air conditioning units, and also provides feasibility for the communication network to realize non-engineering installation, handle poor contact and the like.

The present disclosure also provides a non-transitory computer-readable storage medium storing computer programs, wherein when the computer programs are executed by a processor, cause the processor to perform the steps in any of the method in the above embodiments.

In some embodiments, the storage medium comprises but not limited to: various media capable of storing computer programs, such as a USB disk, a Read-Only Memory (ROM), a Random Access Memory (RAM), a removable hard disk, a magnetic disk, or an optical disk.

Figure 10:
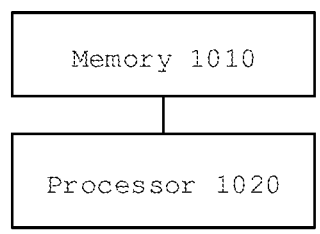
FIG. 10 illustrates a block diagram of a structure of an electronic device of some embodiments of the present disclosure.

As shown in FIG. 10, the present disclosure also provides an electronic device, comprising a memory 1010 and a processor 1020 coupled to the memory 1010, wherein the memory 1010 stores computer programs and the processor 1020 is configured to execute the computer programs to perform the steps in any of the method in the above embodiments.

In some embodiments of the present disclosure, the electronic apparatus further comprises a transmission device and an input/output device, wherein the transmission device is connected to the processor, and the input/output device is connected to the processor. The electronic device is the above-described unit, but is not limited thereto.

In some embodiments of the present disclosure, reference are made to the specific examples in the embodiment and the examples described in the optional implementation manners, and details of the embodiment are not repeated herein.

The above-mentioned serial numbers of the embodiments of the present disclosure are merely for description, and do not represent the advantages or disadvantages of the embodiments.

In the above embodiments of the present disclosure, the description of each embodiment has its own emphasis, and reference are made to the related description of other embodiments for parts that are not described in detail in a certain embodiment.

In the embodiments provided in the present disclosure, it should be understood that the disclosed technical content is able to be implemented in other manners. The above-described apparatus embodiments are merely illustrative, and for example, the division of the units is a logical division, and in actual implementation, there will be another division, for example, multiple units or components are combined or integrated into another system, or some features are omitted, or not executed. In addition, the shown or discussed coupling or direct coupling or communication connection between each other is an indirect coupling or communication connection through some interfaces, units or units, and is electrical or in other forms.

In some embodiments, the units described as separate parts are or are not physically separated, and parts displayed as units are or are not physical units, are located in one position, or are distributed on a plurality of units. Some or all of the units are selected according to actual needs to achieve the purpose of the solution of the embodiment.

In addition, functional units in the embodiments of the present disclosure are able to be integrated into one processing unit, or each unit exists alone physically, or two or more units are integrated into one unit. In some embodiments, the integrated unit is be implemented in the form of hardware, or is also be implemented in the form of a software functional unit.

In some embodiments, the integrated unit, if implemented in the form of a software functional unit and sold or used as a stand-alone product, is be stored in a computer readable storage medium. Based on such understanding, the technical solutions of the present disclosure are embodied in the form of a software product, which is stored in a storage medium and comprises several instructions for causing a computer device (for example, which is a personal computer, a server, or a network device) to execute all or part of the steps of the methods according to the embodiments of the present disclosure. And the aforementioned storage medium comprises: a USB disk, a Read-Only Memory (ROM), a Random Access Memory (RAM), a removable hard disk, a magnetic disk, or an optical disk, and various media capable of storing program codes.

The foregoing are only the embodiments of the present disclosure, and it will be appreciated by those skilled in the art that various modifications and adaptations are able to made without departing from the principles of the present disclosure, and such modifications and adaptations shall be seen as within the scope of the disclosure.

INDUSTRIAL APPLICABILITY

In some embodiments of the present disclosure, a mode that all units in the air conditioning units share one power line in the multi-phase power lines and the shared power line is used for signal transmission is adopted, that is, communication in the air conditioning units is established through a single power line, so that all units realize normal communication without being connected to identical phase lines, thereby reducing the requirement on the topological structure of the power lines, and further solving the technical problem of communication failure caused by an application of different phase lines among the units of an air conditioner in power line carrier communication in the related art.

What is claimed is:

1. A signal transmission method, comprising:
   determining data to be transmitted by a unit in air conditioning units; and
   transmitting, by the unit, the data to be transmitted to other units through a designated power line in multiphase power lines, wherein the designated power line is any power line in the multiphase power lines, and the designated power line is a power line shared by all units in the air conditioning units,
   further comprising:
   determining, by the unit, that designated data transmitted by a designated unit is not received within a preset time; and
   receiving, by the unit, the designated data through at least one unit of other units than the designated unit.

2. The signal transmission method according to claim 1, wherein the designated power line is a naught wire in the multiphase power lines.

3. The signal transmission method according to claim 1, wherein receiving, by the unit, the designated data through the at least one unit of the other units than the designated unit comprises:
   sending, by the unit, an agent request to the at least one unit; and
   receiving, by the unit, the designated data sent by the at least one unit, wherein the designated data sent by the at least one unit is the designated data received by the at least one unit from the designated unit through the designated power line.

4. The signal transmission method according to claim 1, wherein the designated unit comprises an outdoor unit in the air conditioning units.

5. A non-transitory computer-readable storage medium storing computer programs, wherein when the computer programs are executed by a processor, cause the processor to perform the method of claim 1.

6. The non-transitory computer-readable storage medium according to claim 5, wherein the non-transitory computer-readable storage medium stores computer programs, when executed by the processor, cause the processor to:
   determine that designated data transmitted by a designated unit is not received within a preset time; and
   receive the designated data through at least one unit of other units than the designated unit.

7. The non-transitory computer-readable storage medium according to claim 6, wherein receiving the designated data through the at least one unit of the other units than the designated unit comprises:
   sending an agent request to the at least one unit; and
   receiving the designated data sent by the at least one unit, wherein the designated data sent by the at least one unit is the designated data received by the at least one unit from the designated unit through the designated power line.

8. The non-transitory computer-readable storage medium according to claim 6, wherein the designated unit comprises an outdoor unit in the air conditioning units.

9. An electronic device, comprising a memory and a processor coupled to the memory, wherein the memory stores computer programs and the processor is configured to execute the computer programs to perform the method of claim 1.

10. The electronic device according to claim 9, wherein the designated power line is a naught wire in the multiphase power lines.

11. The electronic device according to claim 9, wherein the memory stores computer programs, when executed by the processor, cause the processor to:
    determine that designated data transmitted by a designated unit is not received within a preset time; and
    receive the designated data through at least one unit of other units than the designated unit.

12. The electronic device according to claim 11, wherein receiving the designated data through the at least one unit of the other units than the designated unit comprises:
    sending an agent request to the at least one unit; and
    receiving the designated data sent by the at least one unit, wherein the designated data sent by the at least one unit is the designated data received by the at least one unit from the designated unit through the designated power line.

13. The electronic device according to claim 11, wherein the designated unit comprises an outdoor unit in the air conditioning units.

14. A signal transmission system, comprising: air conditioning units and multiphase power lines, wherein the air conditioning units comprises at least three units, each of the at least three units is connected with at least two power lines in the multiphase power lines, and the at least three units share one power line as a shared power line in the multiphase power lines, and the at least three units transmit signal to each other through the shared power line,
    wherein if it is determined that a first designated unit of the at least three units does not receive a designated data transmitted by a second designated unit within preset time, the first designated unit receives the designated data through a third designated unit of other units than the second designated unit.

15. The signal transmission system according to claim 14, wherein the shared power line is a naught wire in the multiphase power lines.

16. A signal transmission device, comprising:
a first determination module configured to determine data to be transmitted; and
a transmission module configured to transmit the data to be transmitted to other units through a designated power line in multiphase power lines, wherein the designated power line is any power line in the multiphase power lines, and the designated power line is a power line shared by all units in the air conditioning units,
wherein the device further comprises:
a second determination module configured to determine that designated data transmitted by a designated unit is not received within a preset time; and
a receiving module configured to receive the designated data through at least one unit of other units than the designated unit.

17. The signal transmission device of claim 16, wherein the designated power line is a naught wire in the multiphase power lines.

* * * * *